(12) United States Patent
Kwak et al.

(10) Patent No.: US 8,465,864 B1
(45) Date of Patent: Jun. 18, 2013

(54) HEAT DISSIPATION PLATE FOR BATTERY CELL MODULE AND BATTERY CELL MODULE HAVING THE SAME

(75) Inventors: Jin Woo Kwak, Gyeonggi-do (KR); Kyong Hwa Song, Seoul (KR); Han Saem Lee, Gyeonggi-do (KR); Byung Sam Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/482,277

(22) Filed: May 29, 2012

(30) Foreign Application Priority Data

Feb. 7, 2012 (KR) ........................ 10-2012-0012552

(51) Int. Cl.
*H01M 2/16* (2006.01)
*H01M 2/18* (2006.01)

(52) U.S. Cl.
USPC ........................................... 429/120; 429/129

(58) Field of Classification Search
None
See application file for complete search history.

(56) References Cited

U.S. PATENT DOCUMENTS

| 5,344,724 | A | * | 9/1994 | Ozaki et al. | ..................... | 429/94 |
| 6,652,958 | B2 | * | 11/2003 | Tobita | ........................ | 428/298.1 |
| 6,811,921 | B2 | * | 11/2004 | Dansui et al. | ..................... | 429/99 |
| 7,292,440 | B2 | * | 11/2007 | Cho et al. | ........................ | 361/704 |
| 2002/0014748 | A1 | * | 2/2002 | McCullough et al. | ........ | 277/627 |
| 2004/0112424 | A1 | * | 6/2004 | Araki et al. | ..................... | 136/256 |
| 2005/0049350 | A1 | * | 3/2005 | Tonapi et al. | ................. | 524/492 |
| 2009/0053585 | A1 | * | 2/2009 | Nakazawa | ........................ | 429/56 |

FOREIGN PATENT DOCUMENTS

| JP | 2002146672 A | 5/2002 |
| JP | 2009283148 A | 12/2009 |
| KR | 10-2006-0118113 | 11/2006 |
| KR | 10-2008-0042965 | 5/2008 |
| KR | 10-2011-0030225 | 3/2011 |

* cited by examiner

*Primary Examiner* — Patrick Ryan
*Assistant Examiner* — Jose Colucci Rios
(74) *Attorney, Agent, or Firm* — Edwards Wildman Palmer LLP; Peter F. Corless

(57) ABSTRACT

Disclosed is a heat dissipation plate for a battery cell module acting as interface plate for heat dissipation interposed between pouch-type battery cells, which can respond to changes in volume of battery cells and can effectively dissipate heat accumulated in the battery cells and module, and a battery cell module having the same. To this end, the heat dissipation plate includes a composite sheet in which a heat-conductive filler is filled in a matrix resin; and carbon fibers inserted into the composite sheets. The carbon fibers are inserted into the composite sheets to extend to an edge portion of the heat dissipation plate, and a battery cell module configured by stacking the heat dissipation plate and the battery cells.

19 Claims, 6 Drawing Sheets

HEAT DISSIPATION PLATE FOR BATTERY CELL MODULE AND BATTERY CELL MODULE HAVING THE SAME

CROSS-REFERENCE TO RELATED APPLICATION

This application claims under 35 U.S.C. §119(a) the benefit of Korean Patent Application No. 10-2012-0012552 filed Feb. 7, 2012, the entire contents of which are incorporated herein by reference.

BACKGROUND (a) Technical Field

The present invention relates to a heat dissipation plate for a battery cell module. More particularly, the present invention relates to a heat dissipation plate, which can effectively dissipate heat accumulated in battery cells and a module, and a battery cell module having the same.

(b) Background Art

In an electric vehicle, a change or increase in temperature of a battery is often caused by heat generated within the battery due to high power output, high speed charging, and/or repeated charging. As a result, a thermal runaway phenomenon, which reduces the efficiency and stability of the battery, often occurs due to the batteries lack of ability to dissipate and transfer the heat to outside the battery rather than by the heat generated inside the battery.

For example, a lithium ion battery has an operating voltage of 3.6 V or higher and may be used as a power supply of a portable electronic device. Alternatively, a plurality of lithium ion batteries are connected in series and used as a power source of an environmentally-friendly vehicle such as a high power hybrid electric vehicle (HEV), a pure electric vehicle (EV), etc. Such a lithium ion battery has an operating voltage, which is three times higher than that of a nickel-cadmium battery or nickel-metal hybrid battery, and has a high energy density per unit of weight.

The lithium ion battery can be manufactured in various shapes. For example, a pouch-type battery cell, which has become widely used in the automotive industry, has a flexible case and thus can form into various shapes dependent upon its surroundings.

The pouch-type battery cell typically made of a flexible material that can be freely shaped and includes a battery portion and a pouch-type case having a space for accommodating a battery portion. The battery portion has a structure in which a positive electrode plate, a separator, and a negative electrode plate are stacked and wound in one direction. Alternatively the battery portion may also have a structure in which a plurality of positive electrode plates, separators, and negative electrode plates are stacked in multiple layers.

FIG. 1 is a schematic diagram showing a cell module 10 in which a plurality of pouch-type cells 11 are stacked. As shown in FIG. 1, adjacent cells 11 are connected to each other through an electrode portion 12, and it is necessary to provide a predetermined interval, e.g., 3 mm or more, between the adjacent cells 11.

This interval corresponds to a flow space 13 between the cells 11 through which cooling air is introduced and passed. When the cooling air passes through the flow space 13 between the cells 11, the heat of the cells is dissipated to the outside by the cooling air (the arrow of FIG. 1 indicates the flow direction of cooling air).

Changes in volume of the pouch-type battery cells are caused by intercalation and deintercalation of lithium ions in electrode materials during charge and discharge (See, for example, J. H. Lee et al., Journal of Power Sources 119-121 (2003) 833-837, the contents of which are hereby incorporated by reference). Damage to the separator due to expansion of the electrode plates in the battery cell causes an increase in voltage and a reduction in battery capacity as well as an increase in internal resistance, and thus an interfacial member for heat dissipation is required to respond to the expansion of the battery.

Furthermore, when the volume of the battery cell increases in a conventional battery system, the flow space formed between the cells is reduced to deteriorate the cooling performance, and thus the amount of heat generated between adjacent battery cells is increased due to an increase in temperature of the adjacent cells, resulting in a significant deterioration of battery performance. In addition, when the volume of the battery cells is significantly increased, a pouch case, especially those made of a polymer, may be damaged due to leakage of internal electrolytes and emissions of gas.

Additionally, a battery cell module and a pack are configured by stacking a plurality of pouch-type cells, and thus direct damage to adjacent cell may also occur when there is an increase in volume, gas leakage, or an explosion in any one of the cells.

Accordingly, in order to provide a compact heat dissipation system for the battery, which can improve the energy density with respect to the volume, the material should have excellent elasticity and heat dissipation performance to respond to the changes in volume.

The conventional battery case and housing are made of a material in which 20 to 30 wt % of mineral filler (e.g., a flame retardant material) is filled in a plastic substrate such as PC+ABS, PA, PP, etc. This material is flame retardant, chemically resistant, durable, etc., but has no heat dissipation properties.

Moreover, heat dissipation materials under development have focused on the increase in interfacial resistance through an increase in contact surface between fillers due to high density and the improvement of heat transfer characteristics. Furthermore, even plastic-based heat dissipation composite materials cannot effectively dissipate the heat generated from the pouch-type battery due to anisotropic thermal conductivity and low thermal conductivity.

In addition, in an air-cooled system of a conventional cell module 10 as shown in FIG. 1, it is necessary to provide a predetermined interval, e.g., 3 mm or more, between the adjacent cells 11, and thus it is difficult to improve the energy density with respect to the volume. That is, when the battery cell module 10 having a specific volume is configured, it is necessary to provide space between the cells 11, and thus it is difficult to increase the number of cells within the module. Moreover, when the number of cells is increased, the volume of the module 10 rapidly increases due to the space between the cells together with the thickness of each cell. Thus, there is an urgent need to develop a material optimized design for that is still capable of providing heat dissipation to the battery cell module while at the same time providing a more compact design.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a heat dissipation plate for a battery cell module configured to act as an interface plate for heat dissipation. The heat dissipation plate is interposed between pouch-type battery cells and is configured to respond to changes in volume of battery cells and can effectively dissipate heat accumulated in the battery cells and module.

In one aspect, the present invention provides a heat dissipation plate for a battery cell module. The heat dissipation plate acts as an interface plate for heat dissipation interposed between battery cells. The heat dissipation plate of the illustrative embodiment of the present invention may include: a composite sheet in which a heat-conductive filler is filled in a matrix resin; and carbon fibers are inserted into the composite sheets. The carbon fibers are inserted into the composite sheets to extend to an edge portion of the heat dissipation plate accordingly.

In another aspect, the present invention provides a battery cell module including the heat dissipation plate that is interposed between adjacent battery cells in the battery module. The heat dissipation plate has a structure in which an edge portion, in which carbon fibers extend, projects to the outside of the battery cell so that a space between the edge portions of adjacent heat dissipation plates forms a cooling channel.

In still another aspect, the present invention provides a method for manufacturing a heat dissipation plate interposed between battery cells. More specifically, this method may include preparing a composite sheet in which a heat-conductive filler is filled in a matrix resin; preheating a plurality of composite sheets arranged on top and bottom sides using a preheater and continuously feeding the composite sheets to be stacked with carbon fibers continuously fed between the composite sheets on the top and bottom sides thereof; passing the composite sheet on the top side, the carbon fibers, and the composite sheet on the bottom side through a press roller and a heater to press a heat dissipation plate in which the carbon fibers are inserted longitudinally in an axial direction between the composite sheets at the top and bottom sides, respectively; and cutting the heat dissipation plate into a predetermined size using a cutter.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
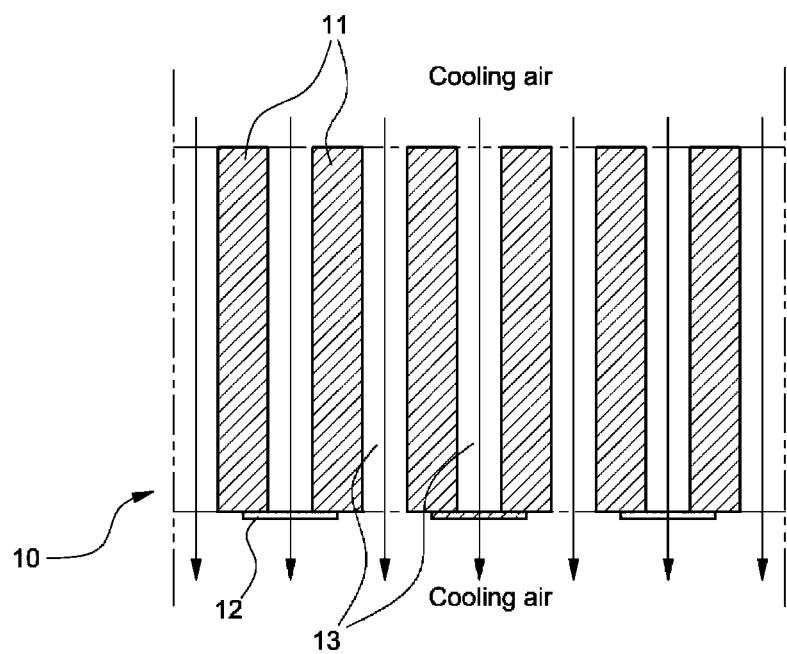
FIG. 1 is a schematic diagram showing a conventional cell module in which a plurality of pouch-type cells are stacked.

Reference numerals set forth in the Drawings includes reference to the following elements as further discussed below:

10: battery cell module
11: battery cell
12: electrode portion
14: heat dissipation plate
14a: composite sheet
14b: carbon fiber
15: edge portion It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The present invention provides a heat dissipation plate acting as a thermal control component of a battery cell module, which can be used as an interface member for heat dissipation interposed between pouch-type battery cells that constitute the battery module as a whole.

The heat dissipation plate of illustrative embodiment of the present invention can be applied to a battery (e.g., a lithium ion battery) of an environmentally-friendly vehicle such as a hybrid electric vehicle (HEV), a pure electric vehicle (EV), a fuel cell electric vehicle (FCEV), etc. and is configured with a material and structure that can effectively dissipate heat generated from each cell to the outside, thus improving lifespan and stability of the battery cell module.

Moreover, the heat dissipation plate of the present invention has a structure which can maximize heat dissipation properties using a material having excellent thermal conductivity. Heat dissipation fillers filled therein form an effective heat transfer path, thus providing high level heat dissipation properties.

The heat dissipation plate of the illustrative embodiment of the present invention is an interface component interposed between the cells and thus should have features that can respond to changes in volume of the cells (such as expansion/contraction of the cells) together with the heat dissipation performance. Accordingly, the heat dissipation plate of the present invention is configured to have excellent elasticity (i.e., compression and restoration) to respond to the changes in volume in the cells, which are caused during charging and discharging of the cells.

In addition, the heat dissipation plate of the present invention is an interface component directly bonded to the cells and thus should be made of a material that is sufficiently flat with the cell and increase the adhesive and gripping properties associated therewith. Accordingly, the heat dissipation plate of the present invention has features that can minimize heat resistance caused on the interface between the cell and the heat dissipation plate.

Figure 2:
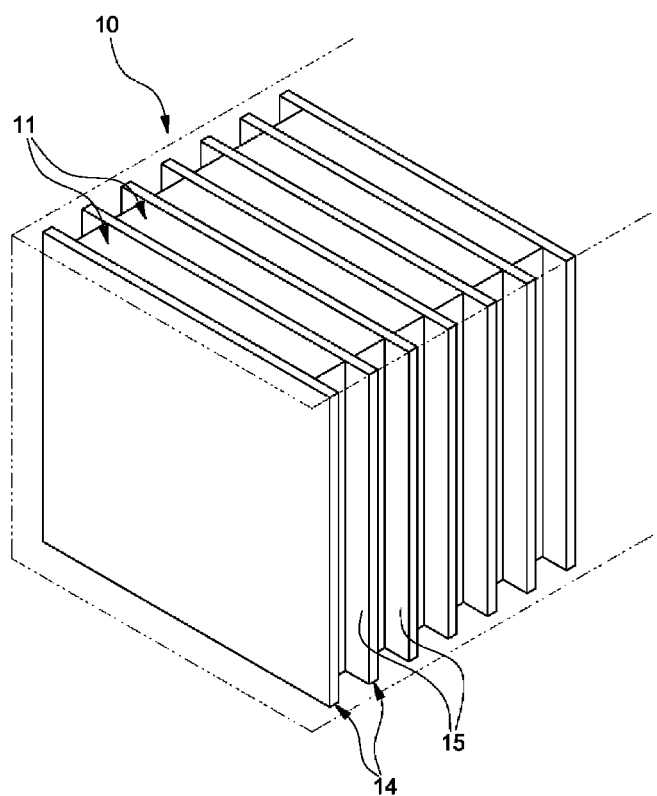
FIG. 2 is a perspective view showing a battery cell module in accordance with an exemplary embodiment of the present invention.
Figure 3:
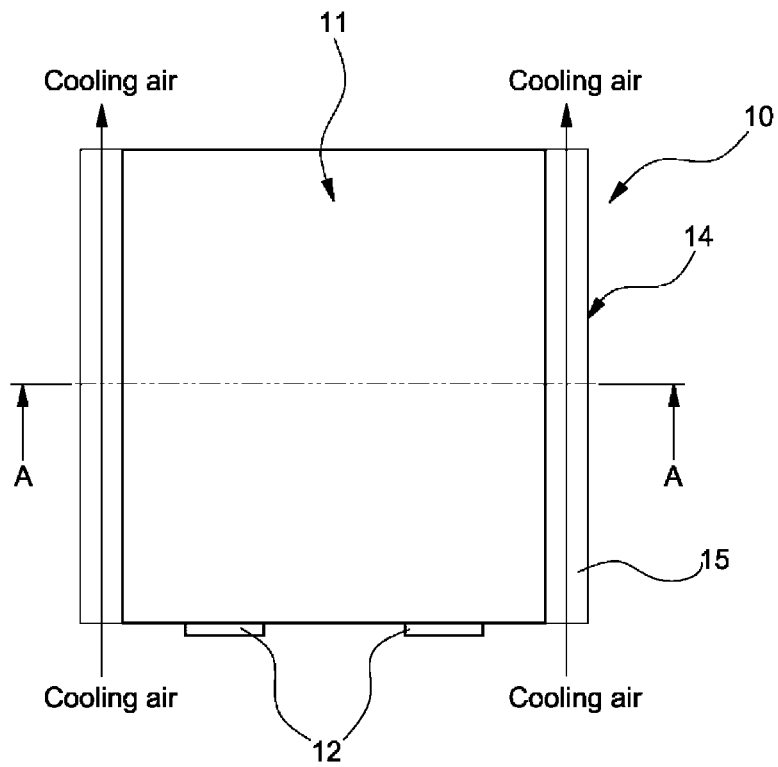
FIG. 3 is a front view of the battery cell module in FIG. 2.

FIG. 2 is a perspective view showing a battery cell module 10 in accordance with an exemplary embodiment of the present invention, and FIG. 3 is a front view of the battery cell module in FIG. 2. In FIG. 2, an electrode portion 12 connecting between cells 11 is located on the lower side and thus is not shown in FIG. 2.

Figure 4:
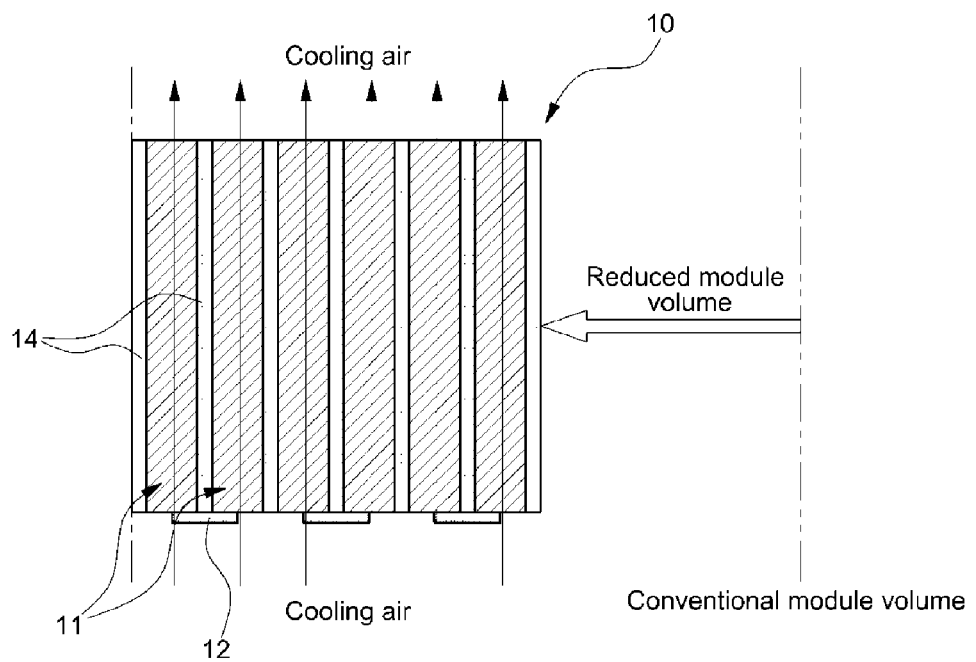
FIG. 4 is a side view of the battery cell module in FIG. 2.
Figure 5:
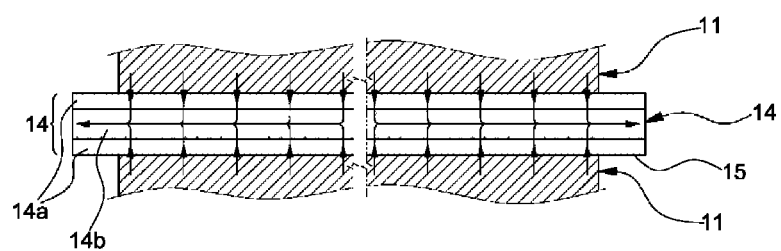
FIG. 5 is a cross-sectional view taken along line "A-A" of FIG. 3.

FIG. 4 is a side view of the battery cell module in FIG. 2, and FIG. 5 is a cross-sectional view taken along line "A-A" of FIG. 3, which shows a heat transfer path according to the illustrative embodiment of the present invention, in which two battery cells 11 and an heat dissipation plate 14 interposed therebetween are only shown as an example.

First, as shown in FIG. 2, a battery cell module 10 includes a plurality of battery cells 11 and a plurality of heat dissipation plates 14 interposed between the battery cells 11.

Here, a plurality of pouch-type battery cells 11 are stacked with the heat dissipation plates 14 interposed therebetween to configure one module 10. The cells 11 and the heat dissipation plates 14 interposed therebetween are in direct contact with and bonded to each other such that heat generated from each cell 11 can be effectively transferred to the heat dissipation plates 14 interposed between the cells 11.

Moreover, as shown in FIG. 3, the heat dissipation plate 14 has an area greater than the area of the cell 11, and thus an edge portion 15 of the heat dissipation plate 14 stacked on the cell 11 projects a predetermined distance from the outside of the cell 11.

In some exemplary embodiments, the edge portion 15 of the heat dissipation plate 14 projects about 10 to 20 mm from each end of the cell 11 such that a sufficient flow space is formed when the module 10 including the cells 11 and the heat dissipation plates 14 is mounted within a battery pack. In FIG. 3, reference numeral 12 denotes positive (+) and negative (−) electrode portions provided in each cell 11 for connection with adjacent cells.

Accordingly, unlike the conventional air-cooled system in which a flow space having a predetermined interval of, e.g., 3 mm or more is formed between the cells 11, in the battery cell module 10 of the present invention, cooling air supplied to the module is guided along the edge portions (denoted by reference numeral 15 in FIG. 3) of adjacent heat dissipation plates 14 as shown in FIG. 4. The cooling air passing through the space between the edge portions 15 of the heat dissipation plates 14 absorbs the heat generated from the cells 11 and transferred to the edge portions of the heat dissipation plates 14, and thus the received heat is dissipated to the outside by the cooling air.

Referring to FIG. 4, the cells 11 with the heat dissipation plates 14 interposed therebetween are stacked in the module 10 of the present invention, from which it can be seen that the volume of the module is reduced relative to the same number of cells 11, compared to FIG. 1.

In FIGS. 3 and 4, the arrows indicate the flow direction of the cooling air passing through the edge portions 15 of the heat dissipation plates 14. In FIG. 5, the arrows indicate the path through which heat is transferred in two battery cells 11 with the heat dissipation plate 14 interposed therebetween. Considering the flow direction of the cooling air (passing through the edge portions of the heat dissipation plates), the most preferable heat transfer path is shown in FIG. 5.

As such, in the illustrative embodiment of the present invention, the heat dissipation plate 14 having excellent thermal conductivity is interposed between the cells 11 such that the heat is moved to the edge portions of the heat dissipation plates 14 and then dissipated to the outside. Here, if the thickness of the heat dissipation plate 14 is less than the conventional interval (3 mm) between the cells, it is possible to increase the number of cells that can be mounted in the module of the same volume, and thus it is possible to increase the energy density per unit volume of the battery.

Furthermore, in the illustrative embodiment of the present invention, the heat dissipation plate 14 is an interface component between the cells, which receives heat from the cells and transfers the heat to the cooling air, and thus is made of a material having excellent thermal conductivity in the range of 30~60 W/mK for increased heat transfer and dissipation performance.

Figure 6:
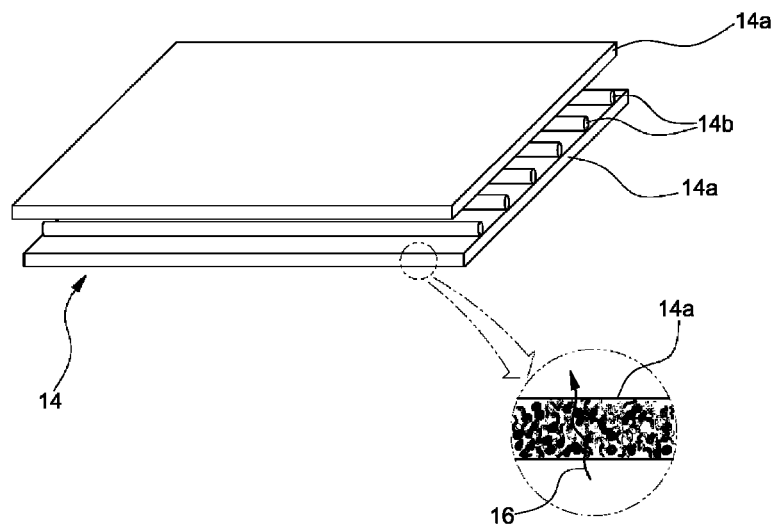
FIG. 6 is a perspective view showing the configuration of a heat dissipation plate in accordance with an exemplary embodiment of the present invention.

The illustrative embodiment of the heat dissipation plate according to the present invention will be described with reference to FIG. 6. FIG. 6 is a perspective view showing the configuration of a heat dissipation plate in accordance with an exemplary embodiment of the present invention, in which an enlarged figure in a circle shows a technical structure of fillers in a composite sheet 14a that forms an outer layer portion.

As shown in FIG. 6, the heat dissipation plate 14 includes a composite sheet 14a, in which a heat conductive filler is filled in a polymer matrix resin, and long carbon fibers 14b inserted longitudinally in one direction into the composite sheets 14a. The carbon fibers 14b form an inner layer portion, and the composite sheets 14a are stacked on both sides of the inner layer portion as an intermediate layer, thus forming outer layer portions that cover the inner layer portion of the carbon fibers 14b.

The composite sheets 14a, in which the heat conductive filler is filled, form the outer layer portions of the heat dissipation plate 14 which is in direct contact with the cells 11, and the carbon fibers 14b inserted into the outer layer portions of the composite sheets 14a form the inner layer portions. The carbon fibers 14b that constitute the inner layer portion extend to the edge portion of the heat dissipation plate 14 which is in contact with the cooling air, and thus the carbon fibers 14b can move the heat transferred from the cells 11 through the composite sheets 14a of the outer layer portions to the edge portion (denoted by reference numeral 15 in FIG. 3) of the heat dissipation plate 14.

In an exemplary embodiment of the present invention, the composite sheet 14a may be a composite sheet including a high heat-conductive filler and a thermoplastic elastomer (TPE) resin, i.e., a composite sheet in which the high heat-conductive filler is filled in the thermoplastic elastomer resin as a matrix resin.

The heat dissipation plate 14 having the above-described configuration may be manufactured in such a manner that the composite sheet 14a in which the heat conductive filler is filled is formed and the carbon fibers 14b are inserted longitudinally in one direction between the composite sheets 14a at the top and bottom sides thereof, followed by a pressing process which includes applying heat and pressure.

Accordingly, it is possible to manufacture the heat dissipation plate 14 in which the composite sheets 14a including the high heat-conductive filler form the outer layer portions and the arrangement of the carbon fibers 14b forms the inner layer portion (i.e., the intermediate layer).

The heat dissipation plate 14 manufactured by stacking and pressing the composite sheets 14a on both sides of the arrangement of the carbon fibers 14b and interposed between the battery cells 11 can effectively respond to the changes in volume of the cells, which are caused during charging and discharging of the battery, by the elasticity of the thermoplastic elastomer material as the matrix resin of the outer layer portions.

Moreover, according to the heat dissipation plate 14 of the illustrative embodiment of the present invention, the elastomer material has excellent adhesive and grip properties with respect to the cells 11 (i.e., the surface of the cells) and thus has no interfacial apertures, thereby ensuring ideal heat transfer properties in which the heat from the cells 11 can be effectively transferred to the carbon fibers 14b through the elastomer composite sheets 14a (or through the high heat-conductive filler contained in the elastomer composite sheets).

As a result, in the cross-sectional view of FIG. 5, the heat generated from the cells 11 is transferred in the thickness direction of the composite sheets of the outer layer portions by phonons as heat transfer carriers and rapidly dissipates in the in-planar direction through the carbon fibers 14b of the inner layer portion.

That is, as shown by the arrow denoted by reference number 16 in FIG. 6, the heat is transferred in the thickness direction of the composite sheet 14a through a three-dimensional heat transfer path of the filler in the composite sheet 14a and rapidly moved in the in-planar direction (as shown in the arrows of the inner layer portion in FIG. 5) by the high thermal conductivity of the carbon fibers 14b inserted in one direction in the inner layer portion. Then, the heat transferred through the carbon fibers 14b reaches the edge portions 15 of the heat dissipation plates 14 and is finally dissipated to the outside by the cooling air passing through the surroundings.

The matrix resin of the composite sheet 14a may include at least one selected from the group consisting of polypropylene (PP), polyamide (PA), polycarbonate (PC), and polyphenylene sulfide (PPS). Otherwise, the thermoplastic elastomer resin having elasticity may be used to increase the grip properties with the battery cell 11 and effectively respond to the expansion of the battery. Here, the thermoplastic elastomer resin may be one selected from the group consisting of thermoplastic polyurethane (TPU) and styrene-ethylene-butylene-styrene (SEBS).

The high heat-conductive filler filled in the matrix resin may include at least one selected from the group consisting of graphite, carbon black, boron nitride, silicon carbide, and aluminum nitride. It is preferable that the filler is filled in an amount of about 40 to 60 wt % with respect to the total weight of the composite sheet 14a such that the thermal conductivity in the thickness direction of the composite sheet 14a may be about 5 W/mK or higher.

Here, if the filler is filled in an amount of about 40 wt % or less, it is difficult to achieve a high thermal conductivity of about 5 W/mK or higher. In contrast, if the amount of filler exceeds 60 wt %, the elasticity and the adhesive and grip properties of the composite sheet 14a are significantly reduced as a result.

Furthermore, each composite sheet 14a, which forms the outer layer portion of the heat dissipation plate 14, may have a thickness of about 1 mm or less, and the entire thickness of the heat dissipation plate 14 in which the carbon fibers 14 are inserted into the outer layer portions may be about 2.5 mm or less, thus reducing the space between the cells (i.e., to an amount less than 3 mm).

The carbon fibers 14b inserted into the inner layer portion of the heat dissipation plate 14 according to the illustrative embodiment of the present invention exhibit different thermal conductivities depending on the precursors. That is, in the crystal structure of carbon fibers made from polyacrylonitrile (PAN), the planes of carbon atoms randomly oriented or stacked in a turbostratic manner, and thus the efficiency of phonon transport for heat transfer is reduced, resulting in a low thermal conductivity (typically, about 50 W/mK or less). However, the carbon fibers made from mesophase pitches by heat treatment have a crystal structure that is more advantageous for the phonon transport, resulting in a high thermal conductivity (about 300 to 900 W/mK). Therefore, it is preferable that the pitch-based carbon fibers are used in the present invention to improve the thermal conductivity, thus maximizing the thermal conduction in the axial direction of the fiber.

Likewise, it is preferable to increase the interfacial adhesion between the resin of the outer layer portions and the carbon fibers by surface treatment of the carbon fibers using ammonia plasma or oxygen plasma.

Figure 7:
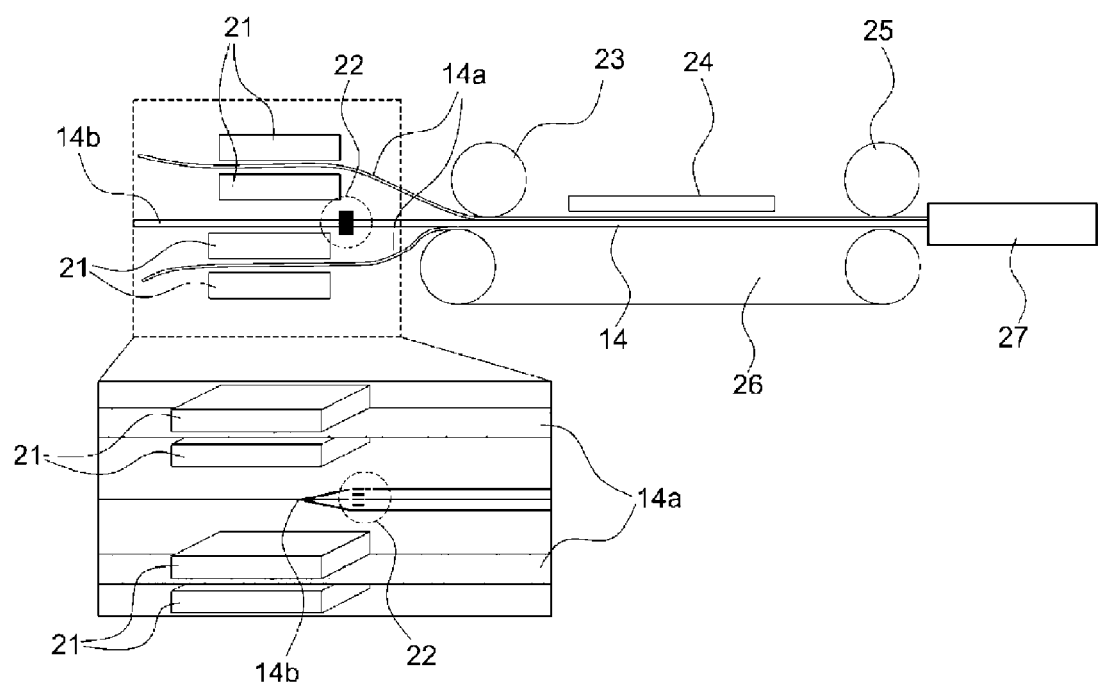
FIG. 7 is a diagram showing an apparatus and process for manufacturing a heat dissipation plate in accordance with an exemplary embodiment of the present invention.

FIG. 7 is a diagram showing an apparatus and process for manufacturing a heat dissipation plate in accordance with an exemplary embodiment of the present invention. In the apparatus shown in FIG. 7, a sheet-shaped heat dissipation plate 14 is manufactured by performing a continuous hot-pressing process on surface-treated pitch-based carbon fibers 14b. First, the composite sheets 14a, which form outer layer portions of the manufactured heat dissipation plate, i.e., in which a high heat-conductive filler is filled, are formed and preheated to a temperature range of about 100 to 180° C. using a preheater 21. Here, the preheater 21 may be an IR preheater, and the composite sheets 14a stacked at the top and bottom sides of the carbon fibers 14b and are passed through the preheater 21 to be preheated and then continuously fed into a roll press.

The surface-treated pitch-based carbon fibers 14b, which form an inner layer portion, are continuously fed into the roll press through a spreader 22, and the carbon fibers 14b spread over the bottom composite sheet 14a are passed through the roll press together with the top composite sheet 14a. Here, the reason that the carbon fibers 14b are fed through the spreader 22 is to allow the carbon fibers 14b to be uniformly distributed and arranged to be the same width as the composite sheets 14a.

A predetermined number of spreaders 22 through which the carbon fibers pass are provided based on the number of strands of carbon fibers in terms of the area of the heat dissipation plate 14. For example, when eight strands are spread, seven spreaders are required.

In the roll press 23, when the top and bottom composite sheets 14a and the carbon fibers 14b in the middle, which are stacked together, are transferred along a conveyor device 26, they pass sequentially through a first press roller 23, a heater 24 maintained at the same temperature (e.g., about 100 to 180° C.) as the preheater 21, and a second press roller 25 to be pressed under hot-pressing conditions. Then, the resulting heat dissipation plate 14 is cut into a desired size by a cutter 27 and used in a cell module assembly.

Next, the present invention will be described in more detail with reference to the following Examples, but the present invention is not limited by the following Example.

Example

First, composite sheets, which are to form top and bottom outer layer portions, were prepared. Here, styrene-ethylene-butylene-styrene (SEBS) was used as a matrix resin of the composite sheet, and 40 wt % of graphite with respect to the total weight of the composite sheet was filled in the SEBS, followed by compression and injection. Moreover, carbon fibers to be inserted into the composite sheets of two outer layer portions were surface-treated using oxygen plasma to increase the interfacial adhesion between the resin of the composite sheet and the carbon fibers. For the oxygen plasma surface treatment of the carbon fibers, a 3 k carbon fiber tow was spread and passed through a plasma reactor including an RF generator (13.5 MHz) and a Pyrex glass chamber.

The treatment conditions were as follows. The pressure was maintained at 55 Pa (50 to 55 Pa is available), the flow rate of plasma was 40 sccm (standard cubic centimeter per minute, 35 to 40 sccm is available), the plasma power was 50 watt, and the treatment time was 10 minutes (5 to 10 minutes are available).

Then, the heat dissipation plate was manufactured by a pressing process in the apparatus of FIG. 3 at preheating and heating conditions of 170° C. The resulting heat dissipation plate was cut into a size in which an edge portion projecting about 20 mm from both ends of a battery cell.

The thus manufactured heat dissipation plate was interposed between the battery cells such that the heat dissipation plate and the cells are stacked together, thus manufacturing a battery cell module.

As described above, the heat dissipation plate for the battery cell module of the present invention may be configured to be an interface member for heat dissipation interposed between the cell of the battery cell module and includes composite sheets in which the high heat-conductive filler is filled and the high heat-conductive carbon fibers inserted in an axial direction into the composite sheets, thus flexibly responding to the changes in volume of the battery cells and effectively dissipating the heat generated from the battery cells to the outside.

In particular, since the heat dissipation plate can flexibly respond to the to the changes in volume of the battery cell module and provide excellent heat dissipation performance through a heat transfer path from the composite sheets to the carbon fibers, the lifespan and stability of the battery cell is increased as well.

Moreover, when the heat dissipation plate of the illustrative embodiment of the present invention is used, it is possible to eliminate the cooling channel between the cells and configure the module by directly stacking the cells and the heat dissipation plates without the cooling channels, thus increasing the number of cells mounted in the module of the same volume and increasing the energy density per unit volume of the battery.

Furthermore, the heat dissipation plate of the illustrative embodiment of the present invention can be effectively used as a heat dissipation plate for a battery of an environmentally-friendly vehicle such as a hybrid electric vehicle, a pure electric vehicle, a fuel cell electric vehicle, etc.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A heat dissipation plate for a battery cell module comprising:
    a pair of composite sheets in which a heat-conductive filler is filled in a matrix resin; and
    carbon fibers inserted between the pair of composite sheets,
    wherein the carbon fibers are inserted longitudinally in one direction between the pair of composite sheets to extend to an edge portion of the heat dissipation plate which projects to an outside of the battery cell, and the heat dissipation plate is interposed between battery cells.

2. The heat dissipating plate of claim 1, wherein the composite sheets are stacked at top and bottom sides of an inner layer portion, which is formed of carbon fibers, such that the composite sheets at the top and bottom sides form outer layer portions which cover the carbon fibers.

3. The heat dissipating plate of claim 1, wherein the matrix resin of the composite sheet comprises at least one selected from the group consisting of polypropylene, polyamide, polycarbonate, and polyphenylene sulfide.

4. The heat dissipation plate of claim 1, wherein the matrix resin of the composite sheet comprises a thermoplastic elastomer resin.

5. The heat dissipating plate of claim 4, wherein the thermoplastic elastomer resin comprises one selected from the group consisting of thermoplastic polyurethane (TPU) and styrene-ethylene-butylene-styrene (SEBS).

6. The heat dissipating plate of claim 1, wherein the heat-conductive filler of the composite sheet comprises at least one selected from the group consisting of graphite, carbon black, boron nitride, silicon carbide, and aluminum nitride.

7. The heat dissipating plate of claim 6, wherein the heat-conductive filler is filled in an amount of 40 to 60 wt % with respect to the total weight of the composite sheet.

8. The heat dissipating plate of claim 6, wherein the composite sheet has a thermal conductivity in the thickness direction of 5 W/mK or higher by the heat-conductive filler.

9. A battery cell module comprising the heat dissipation plate of claim 1,
    wherein the heat dissipation plate has a structure in which an edge portion, in which carbon fibers extend, projects to the outside of the battery cell such that a space between the edge portions of adjacent heat dissipation plates forms a cooling channel.

10. The battery cell module of claim 9, wherein the edge portion of the heat dissipation plate projects about 10 to 20 mm from both ends of the cell.

11. A method for manufacturing a heat dissipation plate interposed between battery cells, the method comprising:
    preparing two composite sheets in which a heat-conductive filler is filled in a matrix resin;
    preheating, by a two separate preheaters, the two composite sheets above and below carbon fibers and continuously feeding the two composite sheets to be stacked on top of and beneath the carbon fibers continuously fed between the two composite sheets;

passing the stacked composite sheets and carbon fibers through a at least one press roller and a heater to form a heat dissipation plate in which the carbon fibers are inserted longitudinally in an axial direction between the composite sheets on the top and bottom thereof; and cutting the formed heat dissipation plate into a predetermined size using a cutter.

12. The method of claim 11, wherein the carbon fibers are fed through a spreader to be uniformly distributed and arranged in to have the same width as the two composite sheets.

13. The method of claim 11, wherein the matrix resin of the composite sheet comprises at least one selected from the group consisting of polypropylene, polyamide, polycarbonate, and polyphenylene sulfide.

14. The method of claim 11, wherein the matrix resin of the composite sheet comprises a thermoplastic elastomer resin.

15. The method of claim 14, wherein the thermoplastic elastomer resin comprises one selected from the group consisting of thermoplastic polyurethane (TPU) and styrene-ethylene-butylene-styrene (SEBS).

16. The method of claim 11, wherein the heat-conductive filler of the composite sheet comprises at least one selected from the group consisting of graphite, carbon black, boron nitride, silicon carbide, and aluminum nitride.

17. The method of claim 16, wherein the heat-conductive filler is filled in an amount of 40 to 60 wt % with respect to the total weight of the composite sheet.

18. The method of claim 11, wherein the carbon fibers are pitch-based carbon fibers.

19. The method of claim 11, wherein the carbon fibers are surface-treated using ammonia plasma or oxygen plasma.

* * * * *